United States Patent
Chiang et al.

(10) Patent No.: US 11,218,721 B2
(45) Date of Patent: Jan. 4, 2022

(54) METHOD AND APPARATUS OF MOTION COMPENSATION BANDWIDTH REDUCTION FOR VIDEO CODING SYSTEM UTILIZING MULTI-HYPOTHESIS

(71) Applicant: MEDIATEK INC., Hsinchu (TW)

(72) Inventors: Man-Shu Chiang, Hsinchu (TW);
Chih-Wei Hsu, Hsinchu (TW);
Tzu-Der Chuang, Hsinchu (TW);
Ching-Yeh Chen, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/260,002

(22) PCT Filed: Jul. 18, 2019

(86) PCT No.: PCT/CN2019/096550
§ 371 (c)(1),
(2) Date: Jan. 13, 2021

(87) PCT Pub. No.: WO2020/015706
PCT Pub. Date: Jan. 23, 2020

(65) Prior Publication Data
US 2021/0329287 A1      Oct. 21, 2021

Related U.S. Application Data

(60) Provisional application No. 62/745,485, filed on Oct. 15, 2018, provisional application No. 62/714,787, (Continued)

(51) Int. Cl.
*H04N 19/513* (2014.01)
*H04N 19/80* (2014.01)
(Continued)

(52) U.S. Cl.
CPC ......... *H04N 19/513* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS 8,422,555 B2    4/2013    Wang et al.
8,693,543 B2    4/2014    Kamp et al.
(Continued)

FOREIGN PATENT DOCUMENTS

| CN | 101491107 A | 7/2009 |
| CN | 101557514 A | 10/2009 |

(Continued)

OTHER PUBLICATIONS

International Search Report and Written Opinion dated Oct. 14, 2019, issued in application No. PCT/CN2019/096550.
(Continued)

*Primary Examiner* — Talha M Nawaz
(74) *Attorney, Agent, or Firm* — McClure, Qualey & Rodack, LLP

(57) ABSTRACT

A method and apparatus of Inter prediction for video coding using Multi-hypothesis (MH) are disclosed. If an MH mode is used for the current block: at least one MH candidate is derived using reduced reference data by adjusting at least one coding-control setting; an Inter candidate list is generated, where the Inter candidate list comprises said at least one MH candidate; and current motion information associated with the current block is encoded using the Inter candidate list at the video encoder side or the current motion information associated with the current block is decoded at the video decoder side using the Merge candidate list. The
(Continued)

coding control setting may correspond to prediction direction setting, filter tap setting, block size of reference block to be fetched, reference picture setting or motion limitation setting.

21 Claims, 6 Drawing Sheets

Related U.S. Application Data filed on Aug. 6, 2018, provisional application No. 62/699,760, filed on Jul. 18, 2018.

(51) Int. Cl.
  *H04N 19/105* (2014.01)
  *H04N 19/159* (2014.01)
  *H04N 19/176* (2014.01)
  *H04N 19/46* (2014.01)

(52) U.S. Cl.
  CPC ........... *H04N 19/176* (2014.11); *H04N 19/46* (2014.11); *H04N 19/80* (2014.11)

(56) References Cited

U.S. PATENT DOCUMENTS

| | | | |
|---|---|---|---|
| 9,374,578 | B1 | 6/2016 | Mukherjee et al. |
| 9,635,356 | B2 | 4/2017 | Li et al. |
| 10,491,892 | B2 | 11/2019 | Lim et al. |
| 10,666,940 | B2 | 5/2020 | Park et al. |
| 2014/0044179 | A1* | 2/2014 | Li ........................ H04N 19/51 375/240.16 |
| 2014/0355692 | A1 | 12/2014 | Ramasubramonian et al. |
| 2019/0246114 | A1* | 8/2019 | Tourapis .............. H04N 19/147 |
| 2020/0213593 | A1* | 7/2020 | Chiang ................ H04N 19/139 |

FOREIGN PATENT DOCUMENTS

| | | |
|---|---|---|
| CN | 101755458 A | 6/2010 |
| CN | 102186070 A | 9/2011 |
| CN | 102934440 A | 2/2013 |
| CN | 104243982 A | 12/2014 |
| CN | 104521237 A | 4/2015 |
| CN | 104662905 A | 5/2015 |
| CN | 107113425 A | 8/2017 |

OTHER PUBLICATIONS

Chinese language office action dated Jul. 15, 2020, issued in application No. TW 108125411.
International Search Report and Written Opinion dated Sep. 30, 2020, issued in application No. PCT/CN2019/096520.
Chinese language office action dated Jul. 9, 2020, issued in application No. TW 108125410.

* cited by examiner

METHOD AND APPARATUS OF MOTION COMPENSATION BANDWIDTH REDUCTION FOR VIDEO CODING SYSTEM UTILIZING MULTI-HYPOTHESIS

CROSS REFERENCE TO RELATED APPLICATIONS

The present invention claims priority to U.S. Provisional Patent Application, Ser. No. 62/699,760, filed on Jul. 18, 2018, U.S. Provisional Patent Application, Ser. No. 62/714,787, filed on Aug. 6, 2018 and U.S. Provisional Patent Application, Ser. No. 62/745,485, filed on Oct. 15, 2018. The U.S. Provisional Patent Applications are hereby incorporated by reference in their entireties.

FIELD OF THE INVENTION

The present invention relates to Inter prediction for video coding using Multi-hypothesis (MH) by combining a first predictor based on a first hypothesis and at least one second predictor based on at least one second hypothesis. In particular, the present invention discloses adjusting various coding setting in order to reduce bandwidth requirement associated with the Multi-hypothesis mode.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighbouring blocks (spatial candidates) or a temporal block (temporal candidate) located in a co-located picture. The co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

FIG. 1 shows the neighbouring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 1, up to four spatial Merge index are derived xfrom $A_0$, $A_1$, $B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates. The additional candidates are divided into three candidate types:

1. Combined bi-predictive Merge candidate (candidate type 1)
2. Scaled bi-predictive Merge candidate (candidate type 2)
3. Zero vector Merge/AMVP candidate (candidate type 3)

In candidate type 1, combined bi-predictive Merge candidates are created by combining original Merge candidate. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 2 illustrates an example of the derivation process for combined bi-predictive Merge candidate. The candidate set 210 corresponds to an original candidate list, which includes mvL0_A, ref0 (231) in L0 and mvL1_B, ref (232) in L1. A bi-prediction MVP 233 can be formed by combining the candidates in L0 and L1.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0'_A is calculated by scaling mvL0_A with ref0 and ref0'. Then, bi-predictive Merge candidate which has mvL0_A and ref0 in list 0 and mvL0'_A and ref0' in list 1, is created and added into Merge candidate list. An example of the derivation process of the scaled bi-predictive Merge candidate is shown in FIG. 3, where candidate list 310 corresponds to an original candidate list and candidate list 320 corresponds to the expanded candidate list including two generated bi-prediction MVPs.

In candidate type 3, Zero vector Merge/AMVP candidates are created by combining zero vectors and reference index, which can be referred. FIG. 4A illustrates an example for adding zero vector Merge candidates, where candidate list 410 corresponds to an original Merge candidate list and candidate list 420 corresponds to the extended Merge candidate list by adding zero candidates. FIG. 4B illustrates an example for adding zero vector AMVP candidates, where candidate lists 430 (L0) and 432 (L1) correspond to original AMVP candidate lists and the candidate list 440 (L0) and 442 (L1) correspond to the extended AMVP candidate lists by adding zero candidates. If zero vector candidates are not duplicated, it is added to Merge/AMVP candidates list.

When a PU is coded in Intra mode, the Intra prediction method only exploits one reference tier (or line) adjacent to the current prediction unit (PU) and one of the Intra prediction modes to generate the predictors for the current PU. The reference tier adjacent to the current prediction unit (PU) means the reference L-shape reconstructed samples, which are used for Intra prediction. For Intra prediction modes, the spatial neighboring reconstructed pixels can be used to generate the directional prediction. There are up to 35 directions in HEVC. Out of all 35 intra prediction modes in HEVC, 3 modes are considered as most probable modes (MPM) for predicting the Intra prediction mode in the current prediction block. Three modes selected as the MPM set. For example, the MPM set comprises the Intra prediction modes used in the left prediction block and in the above prediction block. In case that the Intra prediction modes in two neighboring blocks are identical and both directional, or only one of the two neighboring blocks is available and coded in Intra prediction and at the same time this Intra prediction mode is directional, two neighboring directions immediately next to this direction is also used in MPM. DC mode and Planar mode are also considered in MPM set to fill the available spot in the MPM, especially if the above or top neighboring blocks are not available or not coded in Intra prediction, or the Intra prediction modes in neighboring blocks are not directional. If the intra prediction mode for current prediction block is one of the modes in the MPM set, 1 or 2 bins is used to signal which one it is. Otherwise, it is not the same as any entry in the MPM set, it will be coded as a non-MPM mode. There are all-together 32 such non-MPM modes and a (5-bit) fixed length coding method is applied to signal this mode. The 33 directions are illustrated in FIG. 5. In FIG. 5, there are all together 33 directional modes, so H, H+1~H+8, H−1~H−7, V, V+1~V+8, V−1~V−8 are used. This system can be expanded to a general case, where horizontal and vertical modes are represented as H and V modes. For other directional modes, they can be represented either as H+k or V+k modes, where k=±1, ±2, etc. For example, if 65 directional modes are used, k can be range from ±1 to ±16.

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \overset{\Delta}{\Rightarrow} \begin{cases} vx = (1-a)x - by - e \\ vy = (1-a)y + bx - f \end{cases} \quad (1)$$

An example of the four-parameter affine model is shown in FIG. 6, where block 610 corresponds to the current block and block 620 corresponds to the reference block. The transformed block is a rectangular block. The motion vector field of each point in this moving block can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

In the above equations, $(v_{0x}, v_{0y})$ is the control-point motion vector (i.e., $v_0$) at the upper-left corner of the block, and $(v_{1x}, v_{1y})$ is another control-point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used.

In contribution ITU-T13-SG16-C1016, for an Inter mode coded CU, an affine flag is signalled to indicate whether the affine Inter mode is applied or not when the CU size is equal to or larger than 16×16. If the current block (e.g., current CU) is coded in affine Inter mode, a candidate MVP pair list is built using the neighbour valid reconstructed blocks. FIG. 7 illustrates the neighbouring block set used for deriving the corner-derived affine candidate. As shown in FIG. 7, $\bar{v}_0$ corresponds to a motion vector of the block V0 at the upper-left corner of the current block 710, which is selected from the motion vectors of the neighbouring block a0 (referred as the above-left block), a1 (referred as the inner above-left block) and a2 (referred as the lower above-left block). The $\bar{v}_1$ corresponds to motion vector of the block V1 at the upper-right corner of the current block 710, which is selected from the motion vectors of the neighbouring block b0 (referred as the above block) and b1 (referred as the above-right block).

In the above equation, MVa is the motion vector associated with the blocks a0, a1 or a2, MVb is selected from the motion vectors of the blocks b0 and b1 and MVc is selected from the motion vectors of the blocks c0 and c1. The MVa and MVb that have the smallest DV are selected to form the MVP pair. Accordingly, while only two MV sets (i.e., MVa and MVb) are to be searched for the smallest DV, the third DV set (i.e., MVc) is also involved in the selection process.

The third DV set corresponds to motion vector of the block at the lower-left corner of the current block 710, which is selected from the motion vectors of the neighbouring block c0 (referred as the left block) and c1 (referred as the left-bottom block). In the example of FIG. 7, the neighbouring blocks (a0, a1, a2, b0, bi, b2, c0 and c1) used to construct the control point MVs for affine motion model are referred as a neighbouring block set in this disclosure.

In ITU-T13-SG16-C-1016, an affine Merge mode is also proposed. If current is a Merge PU, the neighbouring five blocks (c0, b0, b1, c1, and a0 blocks in FIG. 7) are checked to determine whether one of them is affine Inter mode or affine Merge mode. If yes, an affine_flag is signalled to indicate whether the current PU is affine mode. When the current PU is coded in affine Merge mode, it gets the first block coded with affine mode from the valid neighbour reconstructed blocks. The selection order for the candidate block is from left, above, above-right, left-bottom to above-left (i.e., c0→b0→b1→c1→a0) as shown in FIG. 7. The affine parameter of the first affine coded block is used to derive the $v_0$ and $v_1$ for the current PU.

In HEVC, the decoded MVs of each PU are down-sampled with a 16:1 ratio and stored in the temporal MV buffer for the MVP derivation of following frames. For a 16×16 block, only the top-left 4×4 MV is stored in the temporal MV buffer and the stored MV represents the MV of the whole 16×16 block.

BRIEF SUMMARY OF THE INVENTION

A method and apparatus of Inter prediction for video coding, wherein the Inter prediction allows Multi-hypothesis (MH) by combining a first predictor based on a first hypothesis and at least one second predictor based on at least one second hypothesis, are disclosed. According to this method, input data related to a current block in a current picture is received at a video encoder side or a video bitstream corresponding to compressed data including the current block in the current picture is received at a video decoder side. If an MH mode is used for the current block: at least one MH candidate is derived using reduced reference data by adjusting at least one coding-control setting; a Merge candidate list is generated, where the Merge candidate list comprises said at least one MH candidate; and current motion information associated with the current block is encoded using the Merge candidate list at the video encoder side or the current motion information associated with the current block is decoded at the video decoder side using the Merge candidate list.

In one embodiment, the coding-control setting corresponds to prediction direction setting. For example, if a target Merge candidate used for deriving said at least one MH candidate. In another example, if a target Merge candidate used for deriving said at least one MH candidate is bi-prediction, the target Merge candidate is used as a uni-prediction mode for deriving said at least one MH candidate. For example, the target Merge candidate can be divided into two uni-prediction candidates for deriving said at least one MH candidate.

In another embodiment, one or more rules regarding handling a target Inter candidate used for deriving said at least one MH candidate can be pre-defined, implicitly determined or explicitly indicated. For example, the rules regarding handling a target Inter candidate used for deriving said at least one MH candidate can be according to the prediction direction setting of the target Inter candidate. Furthermore, the rules can be explicitly indicated by a flag at a CU (coding unit) level, CTU (coding tree unit) level, slice level, picture level, SPS (sequence parameter set), picture level, or PPS (picture parameter set), wherein the flag is signalled at the video encoder side or parsed at the video decoder side.

In another embodiment, the coding-control setting corresponds to filter tap setting for an interpolation filter used for deriving a reference pixel at a sub-pel location for deriving said at least one MH candidate. For example, a shorter interpolation filter can be used. In another example, the shorter interpolation filter corresponds to a 2-tap interpolation filter. Furthermore, the shorter interpolation filter can be generated from a regular interpolation filter corresponding to a longer interpolation filter.

In yet another embodiment, the coding-control setting corresponds to block size associated with a reference block to be fetched for deriving motion compensated samples of the current block at locations including sub-pel locations, where the reference block includes additional rows, additional columns or both for deriving the motion compensated samples at the sub-pel locations, and the additional rows, the additional columns or both are reduced. The additional rows, the additional columns or both being reduced are padded from one or more boundaries of reduced fetched reference block. The additional rows and the additional columns can be reduced to zero or reduced to 1 row and 1 column.

In yet another embodiment, the coding-control setting corresponds to reference picture setting. For example, if a target Merge candidate refers to a same reference picture as the current block, the target Merge candidate is used for deriving one MH candidate. If a target Merge candidate used for deriving one MH candidate refers to a different reference picture from the current block, the target Merge candidate is not allowed for deriving said at least one MH candidate. In another example, if a target Merge candidate for deriving one MH candidate refers to a different reference picture from the current block, motion vector scaling is applied to a target motion vector of the target Merge candidate to generate a scaled motion vector referring to a same reference picture as the current block.

In yet another embodiment, the coding-control setting corresponds to motion limitation setting. If the first predictor and said at least one second predictor have a same reference picture index, the first predictor and said at least one second predictor are combined to derive said at least one MH candidate. In another example, if the first predictor and said at least one second predictor have a same reference picture index, and a first motion vector of the first predictor and a second motion vector of the second predictor are within a predefined region, then the first predictor and said at least one second predictor are combined to derive said at least one MH candidate.

DETAILED DESCRIPTION OF THE INVENTION

Figure 1:
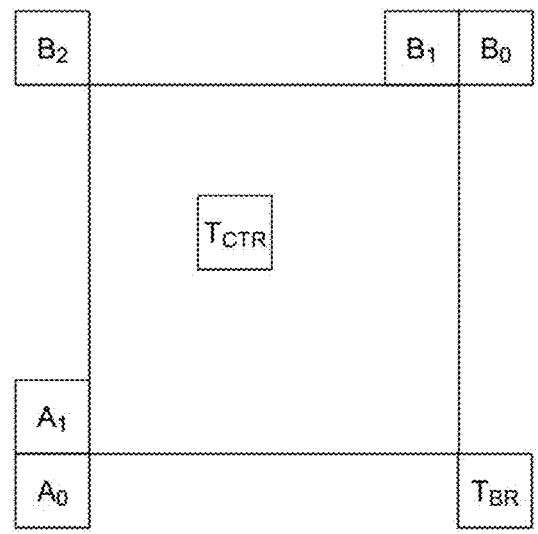
FIG. 1 shows the neighbouring PUs used to derive the spatial and temporal MVPs for both AMVP and Merge scheme.
Figure 2:
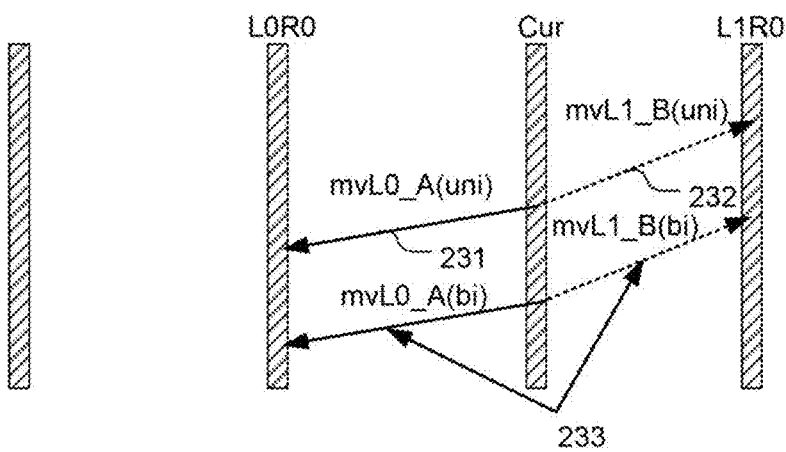
FIG. 2 illustrates an example of the derivation process for combined bi-predictive Merge candidate.
Figures 3, 4A:
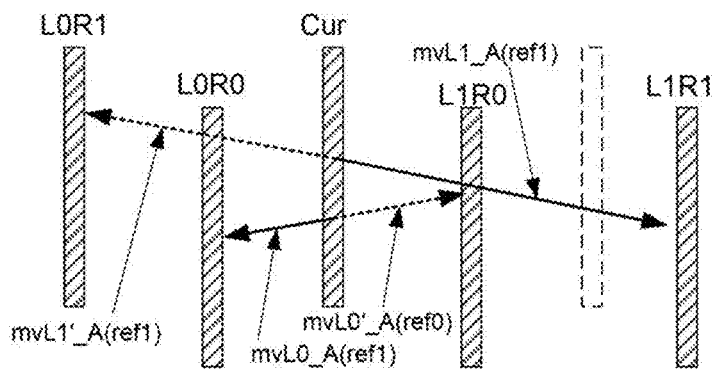
FIG. 3 illustrates an example of the derivation process of the scaled bi-predictive Merge candidate, where candidate list on the left corresponds to an original candidate list and the candidate list on the right corresponds to the expanded candidate list including two generated bi-prediction MVPs.
FIG. 4A illustrates an example of adding zero vector Merge candidates, where the candidate list on the left corresponds to an original Merge candidate list and the candidate list on the right corresponds to the extended Merge candidate list by adding zero candidates.
Figure 4B:
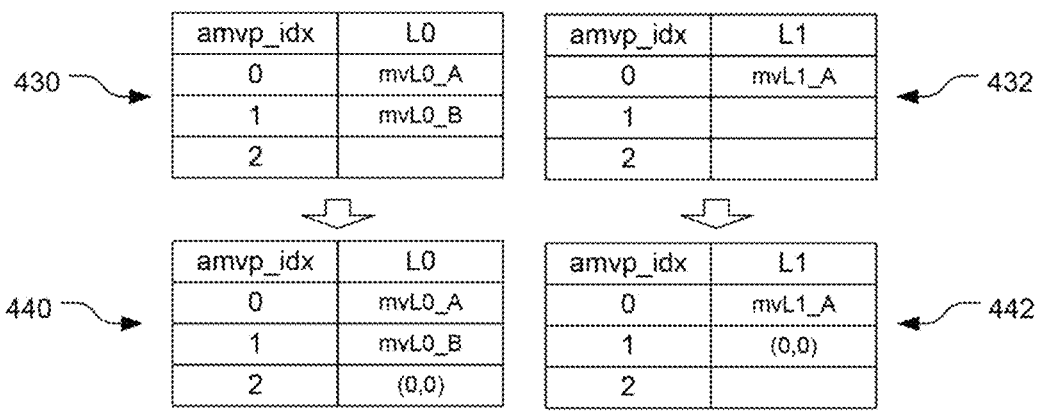
FIG. 4B illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.
Figure 5:
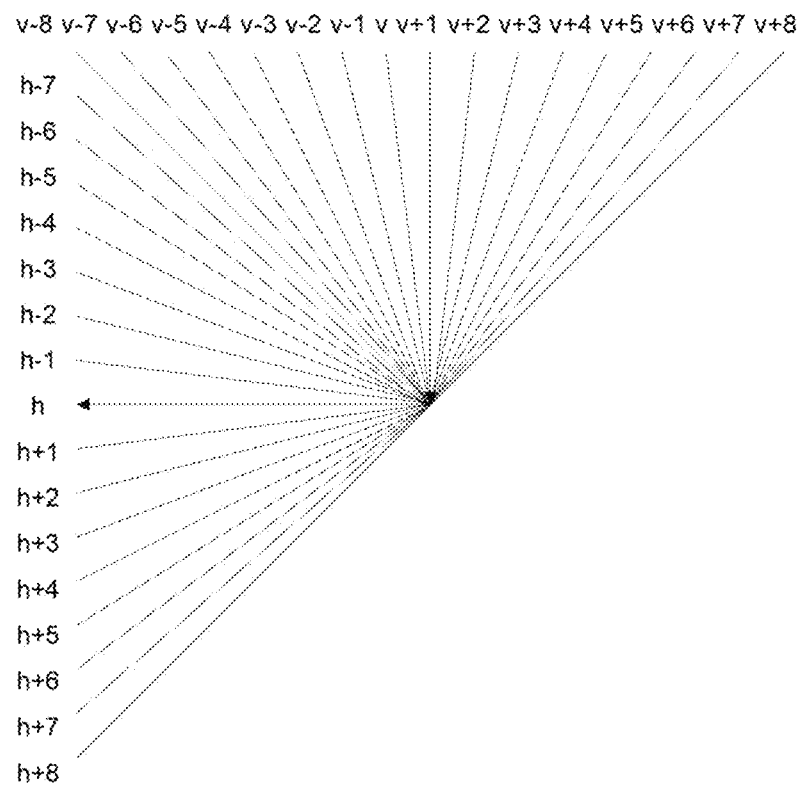
FIG. 5 illustrates the 33 directional Intra prediction mode as used by the HEVC (high efficiency video coding) standard.
Figure 6:
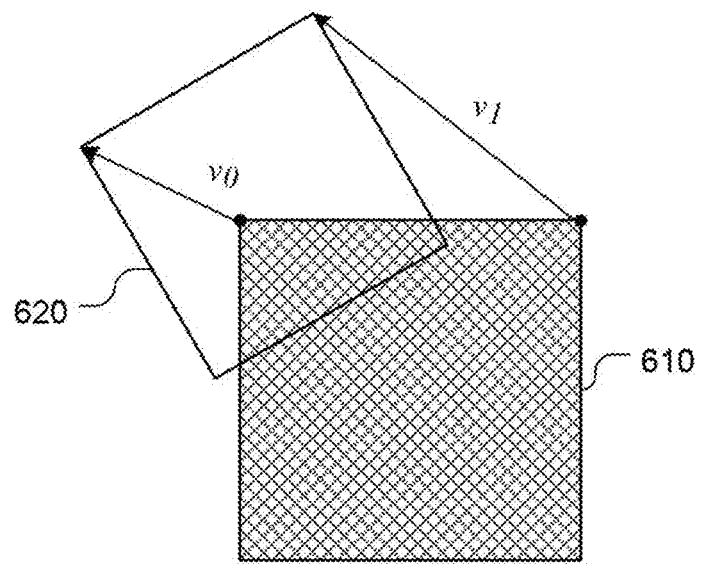
FIG. 6 illustrates an example of four-parameter affine model, where the motion model can be derived based on motion vectors at two control points.
Figure 7:
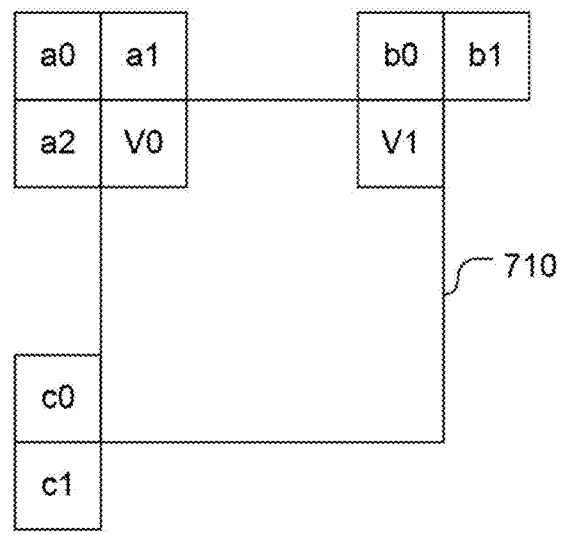
FIG. 7 illustrates the neighbouring block set used for deriving the corner-derived affine candidates.

The following description is of the best-contemplated mode of carrying out the invention. This description is made for the purpose of illustrating the general principles of the invention and should not be taken in a limiting sense. The scope of the invention is best determined by reference to the appended claims.

In this invention, a Multi-Hypothesis (MH) mode is disclosed to improve Inter prediction, which is an improved method for Skip and/or Merge and/or Intra modes. The proposed Multi-hypothesis mode is described as follow.

In original Skip and Merge modes, one Merge index will be used to select one motion candidate from the Merge candidate list. The motion candidate may be either uni-prediction or bi-prediction derived by the candidate itself. The generated motion compensated predictor is called the first one hypothesis here in this disclosure. For the proposed Multi-hypothesis mode, it will produce the second hypothesis in addition to the first one. The second hypothesis of predictors can be generated by motion compensation from Merge or Skip mode, or can be generated by an Intra prediction mode. When Multi-hypothesis mode is supported, one or more Multi-hypothesis candidates are available from Skip and/or Merge and/or Intra mode. When the second hypothesis is generated by an Intra prediction mode, the proposed Multi-hypothesis mode is called MH mode for Intra in this disclosure. When the second hypothesis is generated by motion compensation from Merge or Skip mode or any other inter mode, the proposed Multi-hypothesis mode is called MH mode for Merge in this disclosure. For MH mode for Intra, each Multi-hypothesis candidate contains one motion candidate and one Intra prediction mode, where the motion candidate is selected from Candidate List I and the Intra prediction mode is selected from Candidate List II. In other words, one motion candidate can match one or more Intra prediction modes at the encoder and through encoding mode decision. One motion candidate and one Intra candidate is decided and signalled to the decoder.

In one embodiment, when MH mode for Intra is supported, one flag is signalled to indicate whether MH mode for Intra mode is applied.

In another embodiment, when MH mode for Intra is supported, one flag is signalled to indicate whether MH mode for Intra is applied. If the flag is on, one additional Intra mode index is signalled to indicate the Intra prediction mode from Candidate List II.

In another embodiment, MH mode for Intra is supported without additional syntax. Each candidate for MH mode for Intra can be inserted into the Merge candidate list and indicated by the Merge index for original Skip and Merge mode. The length (L) of the Merge candidate list can be kept the same or be extended to L+N, where N is a positive number and can vary with a predetermined rule like block width and/or block height.

In another embodiment, MH mode for Intra is supported without additional syntax. Each candidate for MH mode for Intra can be inserted into the Merge candidate list with a predefined rule or order and indicated by the Merge index for original Skip and Merge mode. In one embodiment, the rule to form an MH candidate list is that each candidate for MH mode for Intra will be inserted adjacent to the corresponding motion candidate. For example, the Merge candidate list supporting MH mode is formed as follows: {$A_0$, ($A_0$, Planar), ($A_0$, DC), . . . , $A_1$, ($A_1$, Planar), ($A_1$, DC), . . . , $B_0$, ($B_0$, Planar), ($B_0$, DC), . . . , $B_1$, ($B_1$, Planar), ($B_0$, DC), . . . }, where Candidate List I={$A_0$, $A_1$, $B_0$, $B_1$, . . . }, Candidate List II={Planar, DC, . . . }, and each of (A0, Planar), (A0, DC), (A1, Planar), (A1, DC), (0, Planar), ($B_0$, DC), ($B_1$, Planar), ($B_0$, DC) represents a Multi-hypothesis (MH) candidate (or called a candidate with Multi-hypothesis). In this example, the Merge candidate list supporting MH mode comprises regular Merge candidates (e.g. $A_0$, $A_1$, $B_0$, etc.) and MH Merge candidates (e.g. ($A_0$, Planar), ($A_1$, Planar), ($B_0$, Planar), etc.).

In another embodiment, the rule to form an MH candidate list is that the candidates for MH mode for Intra can be inserted at a specific position of the Merge candidate list. For example, the order of candidates for MH mode for Intra can be the spatial candidates, the temporal candidates, candidate type 1, candidate type 2, or candidate type 3, etc. In another embodiment, the rule to form an MH candidate list is that the candidate for MH mode for Intra can be inserted into any position or with a predefined order.

In another embodiment, when MH mode for Intra is applied, one Intra prediction mode can be selected from Candidate List II depending on a predetermined order. The Intra prediction mode in front of Candidate List II can be implicitly decided as the chosen Intra prediction mode, or the Intra prediction mode in the front of Candidate List II can be signalled with the shortest code word. The order can depend on a certain criterion such as the properties of the corresponding motion candidate or the block width or block height. For example, when the block width is much larger than the block height, the candidates for MH mode for Intra having Intra directional modes close to the vertical direction can be inserted prior to those having Intra directional modes close the horizontal direction. If the block height is much larger than the block width, the insertion order can be inverted from the previous case. For another example, for those Intra prediction modes with the same motion candidates, when the MVP position of the motion candidate is from left, the candidates with Intra directional modes close to the horizontal direction can be inserted prior to those with Intra directional mode close to the vertical direction.

In another embodiment, when MH mode for Intra is applied, Candidate List II can be the same as that for normal Intra mode or be a subset of for the normal Intra mode set. The size of Candidate List II or the modes within Candidate List II can vary with the block width or block height or the number of available Intra prediction modes for normal Intra mode. When Candidate List II contains only one candidate Intra mode, the target Intra prediction mode for MH mode for Intra can be implicitly assigned instead of explicitly signalled. For example, when the block size is larger than a predetermined threshold, one Intra mode index is signalled to indicate a target Intra prediction mode from Candidate List II; otherwise, only one Intra prediction mode is allowed for MH mode for Intra. For those small blocks, if the block width is much larger than the block height, the vertical mode is assigned as the target Intra prediction mode, and if the block height is much larger than the block width, the horizontal mode is assigned as the target Intra prediction mode. For the rest small blocks, the planar mode is assigned as the target Intra prediction mode.

In another embodiment, when MH mode for Intra is applied, Candidate List I can be the same as that for a normal Merge mode or be a subset of that for a normal Merge mode. For example, Candidate List I contains only spatial candidates and/or temporal candidates. In another example, Candidate List I can exclude extended modes, which are not used in HEVC.

When MH mode for Merge is supported, some settings such as prediction direction settings, different tap settings, block portion settings, motion settings, forbidden settings, or any combination of above can be applied to any one of hypotheses or both hypotheses of MH mode for Merge. Those settings can be used to meet different motion compensation bandwidth or computational complexity of MH mode for Merge. Those settings can be enabled depending on implicit or explicit signalling. In one embodiment, the implicit assignment can depend on the block width, block height or block size. For example, the settings are applied to small blocks instead of large blocks. In another embodiment, the explicit signalling can depend on a flag at a CU level, CTU level, slice level, picture level, SPS (sequence parameter set), PPS (picture parameter set), etc.

In one embodiment, when the prediction direction settings are applied to MH mode for Merge, only uni-prediction with one predefined reference list can be used for the hypothesis of MH mode for Merge.

In another embodiment, when different tap settings are applied to MH mode for Merge, shorter length of the sub-pel interpolation filter for motion compensation (MC) can be used to replace the original interpolation filter for MC. For example, integer-pel MC can be used instead of the sub-pel MC.

In another embodiment, when block portion settings are applied to MH mode for Merge, only sub-region of the whole block can be added for the hypothesis. The sub-region can be formed by multiple continuous sub-blocks or multiple separate sub-blocks. For example, the sub-region includes the block area exclusive of the boundary. In another example, the sub-region includes the sub-blocks nearing the centre of block. For still another example, the sub-region includes the sub-blocks at the corners. The portion can be expanded or shrunk depending on a certain criterion like block width or block height or block size.

In another embodiment, when motion settings are applied to MH mode for Merge, the hypothesis that is generated by the motion candidate satisfying the predefined motion conditions can be used for MH mode for Merge. The motion condition can be that the reference index is the same as that for the other hypothesis, or the motion vectors are within a predefined region, or any combination of above.

In another embodiment, when forbidden settings are applied to MH mode for Merge, the hypothesis will not be added. In other words, the forbidden setting can be viewed as disabling MH mode for Merge in some conditions. The conditions can depend on the block width, block height or block size. For example, when the block is smaller than N×M, MH mode for Merge is disabled, where N can be 4 or 8 and M can be 4 or 8.

In another embodiment, the combined settings for MH mode for Merge can be many possible combinations. One combination is different tap settings and block portion settings. In other words, different length of sub-pel interpolation filters can be applied to different portions of the block. For example, for the sub-region on the boundary of the block, integer-pel MC is used, for the sub-region nearing the centre of block, longer length of sub-pel interpolation filter is used; and for the rest sub-region(s), shorter length of sub-pel interpolation filter is used.

In one embodiment, when MH mode is applied to more than one existing mode, MH mode for one existing mode cannot be used to generate the hypotheses for MH mode for another existing mode and the syntax design is also excluded. For example, the hypothesis for MH mode for Intra cannot be generated by MH mode Inter (or also called as MH mode for Merge or MH Merge). A flag to indicate whether MH mode Inter (or also called as MH mode for Merge or MH Merge) is used or not can be signalled or parsed. If the flag is on, the flag needs not to be signalled and can be inferred to be off. In the same way, a flag to indicate whether MH mode Inter (or also called as MH mode for Merge or MH Merge) is used or not can be signalled or parsed. When the flag is on, the flag for needs not to be signalled and can be inferred to be off.

In one embodiment, the Intra prediction modes in Candidate List II can be fixed as {Planar, DC, Horizontal, Diagonal, Vertical, Vertical diagonal} or any other subset of these seven modes. For example, the Intra prediction modes in Candidate List II can be {Planar, DC, Horizontal, Vertical}.

In another embodiment, the number of the Intra prediction modes in Candidate List II can vary with the number of Intra prediction modes for normal Intra mode. When the Intra prediction modes for normal Intra mode are the same as HEVC, the Intra prediction modes in Candidate List II can be {Planar, DC, Horizontal, Diagonal, Vertical, Vertical diagonal} or any other subset of these seven modes. When the number of Intra prediction modes for normal Intra mode increases, the number of Intra prediction mode in Candidate List II increases and can be extended from {Planar, DC, Horizontal, Diagonal, Vertical, Vertical diagonal} or any other subset of these seven modes with a certain equation. The Candidate List II can be increased according to {Planar, DC, Horizontal, Diagonal, Vertical, Vertical diagonal} or any other subset of these seven modes±offset. According to another embodiment, the Candidate List II can be increased according to {Planar, DC, directional modes}, where directional modes include horizontal (H) and vertical modes (V), and H+k or V+k modes, where k=1 or ±2 or ±3 or +4, etc.

The Intra prediction modes in Candidate List II can be selected from n Intra prediction mode sets, where n is a positive integer. The Intra prediction modes for each set can be different from each other set or can be any other subset of another Intra prediction mode set. The number of Intra prediction modes for each set can vary with the block width or block height. When the number of Intra prediction modes within the selected set is equal to one, the Intra prediction mode can be inferred without additional Intra mode index. In one embodiment, the Intra prediction mode set for Candidate list II can be selected according to an explicit index signalled at a CU level, CTU level, slice level, picture level, SPS level, or PPS level, etc. In another embodiment, the Intra prediction mode set for Candidate list II can be selected according to the motion candidate. For example, the motion candidate indicated by index 0, which can be Merge index 0 or index 0 in Candidate list I, is matched with Planar mode; the motion candidate indicated by index 1, which can be Merge index 1 or index 1 in Candidate list I, is matched with DC mode; the motion candidate indicated by index 2, which can be Merge index 2 or index 2 in Candidate list I, is matched with horizontal mode; and the motion candidate indicated by index 3, which can be Merge index 3 or index 3 in Candidate list I, is matched with vertical mode.

When an MH mode (e.g. MH mode for Merge or MH mode for Intra) is supported, some settings such as prediction direction settings, different tap settings, block portion settings, motion settings, forbidden settings, block padding settings, reference picture settings, MV limitation settings, or any combination of above can be applied to any one of hypotheses or both hypotheses of MH mode for Merge. Those settings can be used to meet different motion compensation bandwidth or computational complexity of MH mode for Merge. Those settings can be enabled depending on implicit or explicit signalling. In one embodiment, the implicit assignment can depend on the block width, block height or block size. For example, the settings can be applied to the blocks smaller than N×M where N and M can be selected from {2, 4, 8, 16}. In some embodiments, N×M can be represented using a block size threshold generated by the result of N×M. In another example, the settings are applied to certain blocks according to a predetermined table associated with block width or block height. An exemplary table is shown in Table 1. The table can also be extended according to the block partition. The settings can be applied to those blocks satisfying the conditions marked with 'O'. In another embodiment, the explicit signalling can depend on a flag at a CU level, CTU level, slice level, picture level, SPS level, or PPS level, etc.

TABLE 1

| width<br>height | 2 | 4 | 8 | 16 | 32 | 64 | 128 |
|---|---|---|---|---|---|---|---|
| 2 | O | O | O | O | O | O | O |
| 4 | O | O | O | O | O | O | O |
| 8 | O | O | O | | | | |
| 16 | O | O | | | | | |
| 32 | O | O | | | | | |
| 64 | O | O | | | | | |
| 128 | O | O | | | | | |

In one embodiment, when the prediction direction settings are applied to MH mode, only the hypothesis with uni-prediction can be taken as the hypothesis of MH mode. The hypothesis with bi-prediction is disallowed or the hypothesis with bi-prediction is used to generate the hypothesis with uni-prediction through different mechanisms. The mechanism can be to divide one hypothesis with bi-prediction, denoted as {{mvL0, ref0}, {mvL1, ref1}}, into multiple hypotheses with uni-prediction like Hypothesis 1 with {mvL0, ref0}, Hypothesis 2 with {mvL1, ref1}, etc. The rule to handle the hypothesis with bi-prediction can be predefined, or implicitly derived with block width, block height or block properties (e.g. other applied Inter tools), or explicitly indicated with an signalled flag at CU level, CTU level, slice level, picture level, SPS level, or PPS level, etc. For example, when an SPS-level flag is on, the hypothesis with bi-prediction cannot be used for MH mode; and when the flag is off, the hypothesis with bi-prediction is divided into multiple hypotheses with uni-prediction and then can be used for MH mode.

In another embodiment, when different tap settings are applied to MH mode, the sub-pel interpolation filter with a shorter length for motion compensation (MC) can be used to replace the original interpolation filter for MC. The length of the interpolation filter can be 2, 4, 6, or 8. For example, 2-tap interpolation filter such as the bilinear interpolation filter can be used for MH mode. In another embodiment, a shorter interpolation filter can be generated from the interpolation filter, which already exists and is well defined, so that no additional hardware design is needed. For example, a 2-tap interpolation filter can be generated from an 8-tap interpolation filter by summing up the four taps at the left hand side to be one coefficient and the other four taps at the right hand side to be another one coefficient. Therefore, if an 8-tap interpolation filter is defined as {−1, 4, −11, 45, 34, −10, 4, −1}, the corresponding 2-tap interpolation filter is {37, 27}. In another example, a 4-tap interpolation filter for the luma component can be the same as the existing 4-tap interpolation filter for the chroma component.

While performing the fractional MC for a W×H block, where W is the block width and H is the block height, a larger region containing the current block needs to be fetched to apply the interpolation filter. According to embodiments of the present invention, the region of samples required for the interpolation is called a fetched block. For example, for an 8-tap interpolation filter, the size of the fetched block is (W+3+4)×(H+3+4). In one embodiment, when block padding settings are applied to MH mode, the size of the fetched block can be reduced. The samples, the required samples for the interpolation filter outside the reduced fetched block can be filled with the samples padded from the boundary of the reduced fetched block. For example, the fetched block can be reduced to the current block and no additional sample outside the current block needs to be fetched. In another example, the fetched block can be reduced to a (W+1)×(H+1) block containing the current block.

In another embodiment, when reference picture settings are applied to MH mode, only the hypotheses, which refer to the same reference picture, can be combined. The motion candidate with a different reference picture is disallowed or used to generate a new valid motion candidate through MV scaling. The mechanism of MV scaling is described as follows. When the first motion candidate for one hypothesis is uni-prediction, the MVs of the second motion candidate for the additional hypothesis need to be scaled to the reference picture of the first motion candidate. When the first motion candidate is bi-prediction with motion vectors MV0 and MV1, the MV0/MV1 of the second motion candidate can be scaled to reference picture 0/1, respectively. The MV0 refers to reference picture 0 and MV1 refers to the reference picture 1. Alternatively, the MV0/MV1 of the second motion candidate can be scaled to one of reference picture 0 and reference picture 1, which is nearest to MV0/MV1 of the second motion candidate, respectively.

In another embodiment, when MV limitation settings are applied to MH mode, only the hypotheses that refer to the same reference picture and are generated by similar MVs can be combined. The allowable distance between the MVs within the same reference picture for multiple hypotheses can depend on the block width or block height or the overlapping region referred by the MVs within the same reference picture from multiple hypotheses. For those MVs within the same reference picture, but exceeding the allowable distance, the MH mode is disallowed; the MV values are shrunk or the MV directions re adjusted to the allowable distance.

Any combination of above can be applied to any Multi-hypothesis mode such as MH mode for Merge or MH mode for Intra.

Any of the foregoing proposed methods can be implemented in encoders and/or decoders. For example, any of the proposed methods can be implemented in an Inter coding module or Intra coding module of an encoder, a motion compensation module, a Merge candidate derivation module of a decoder. Alternatively, any of the proposed methods can be implemented as a circuit coupled to the inter coding module or intra coding module of an encoder and/or motion compensation module, a merge candidate derivation module of the decoder.

Figure 8A:
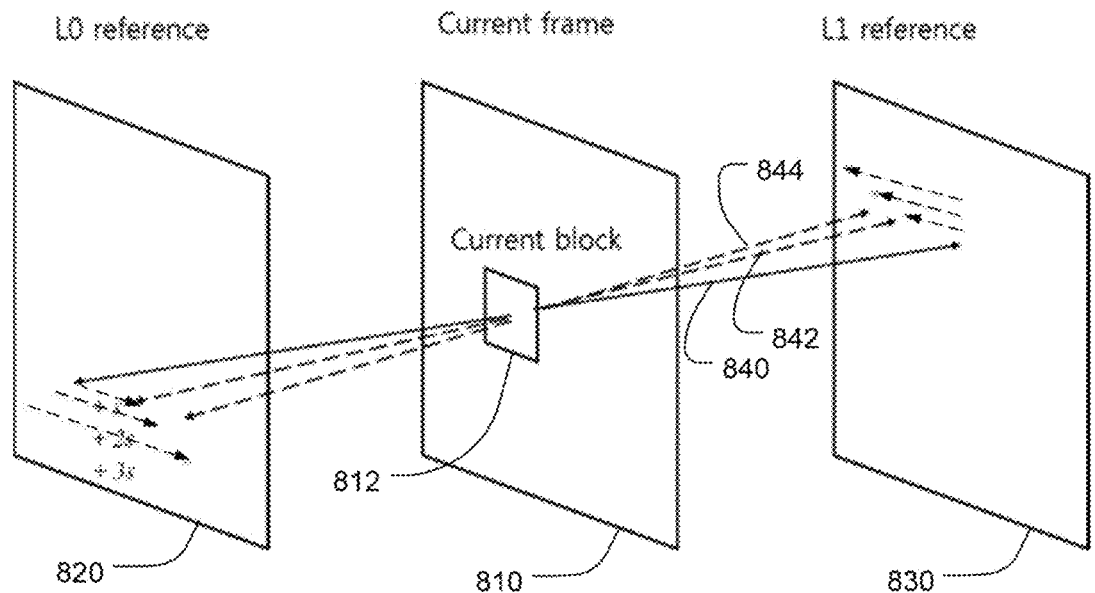
FIG. 8A illustrates an example of UMVE search process for a current block in the current frame.
Figure 8B:
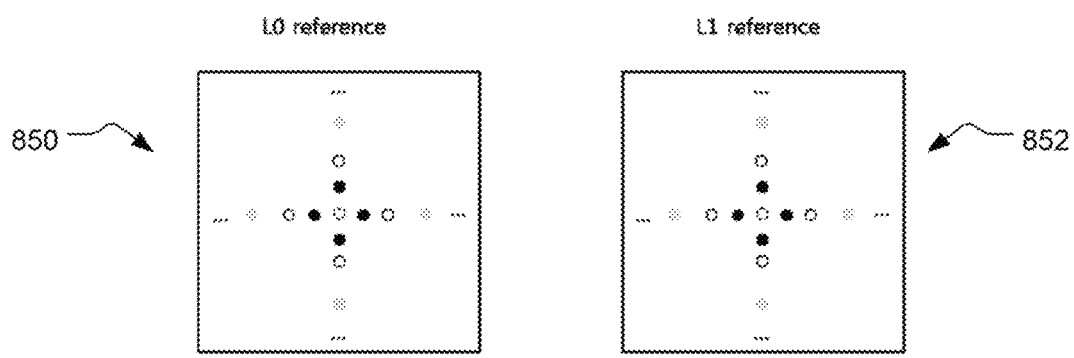
FIG. 8B illustrates an example of UMVE search at specific locations around the centre point vertically and horizontally for L0 reference and L1 reference.

In JVET-K0115 (S. Jeong, et al., "*CE4 Ultimate motion vector expression in J0024 (Test 4.2.9)*", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0115), ultimate motion vector expression (UMVE) proposed in JVET-J0024 (S. Akula, et. Al., "*Description of SDR, HDR and 3600 video coding technology proposal considering mobile application scenario by Samsung, Huawei, GoPro, and HiSilicon*", in Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0024) is presented. FIG. 8A illustrates an example of UMVE search process for a current block 812 in the current frame 810. Frame 820 in reference list L1 and frame 830 in reference list L1 correspond to the two references for bi-prediction. Line 840 corresponds to a line through the centre of the current block 812 and two corresponding pixels in frames 820 and 830. The search is performed around the centre points associated with line 840 (e.g. lines 842 and 844). In order to simplify the search process, only specific locations around the centre point vertically and horizontally will be searched as shown in FIG. 8B for L0 reference (850) and L1 reference (852). UMVE is used for either Skip or Merge modes with a proposed motion vector expression method. UMVE re-uses the same Merge candidate as VVC (versatile video coding) standard being developed. Among the Merge candidates, a candidate can be selected, and is further expanded by the proposed motion vector expression method. UMVE provides a new motion vector expression with simplified signalling. The expression method includes prediction direction information, starting point, motion magnitude, and motion direction.

This proposed technique uses a Merge candidate list as is. However, only candidates that are default Merge type (MRG_TYPE_DEFAULT_N) are considered for UMVE's expansion. Prediction direction information indicates a prediction direction among L0, L1, and L0 and L1 predictions. In B slice, the proposed method can generate bi-prediction candidates from Merge candidates with uni-prediction by using mirroring technique. For example, if a Merge candidate is uni-prediction with L1, a reference index of L0 is decided by searching a reference picture in list 0, which is mirrored with the reference picture for list 1. If there is no corresponding picture, the nearest reference picture to the current picture is used. The MV of L0 is derived by scaling MV of L1. The scaling factor is calculated by POC (picture order count) distance.

If the prediction direction of the UMVE candidate is the same as one of the original Merge candidate, the index with value 0 is signalled as an UMVE prediction direction. However, if the prediction direction of the UMVE candidate is not the same as one of the original Merge candidate, the index with value 1 is signalled. After signalling the first bit, remaining prediction direction is signalled based on the pre-defined priority order of UMVE prediction direction. Priority order is L0/L1 prediction, L0 prediction and L1 prediction. If the prediction direction of Merge candidate is L1, Code '0' is signalled for UMVE' prediction direction L1. Code '10' is signalled for UMVE' prediction direction L0 and L1. Code 'ii' is signalled for UMVE' prediction direction L0. If L0 and L1 prediction lists are the same, UMVE's prediction direction information is not signalled.

Base candidate index defines the starting point. Base candidate index indicates the best candidate among candidates in the list as shown in Table 2.

TABLE 2

| Base candidate IDX | 0 | 1 | 2 | 3 |
|---|---|---|---|---|

The distance indices for various distances are shown in Table 3.

TABLE 3

| Distance IDX | 0 | 1 | 2 | 3 | 4 | 5 | 6 | 7 |
|---|---|---|---|---|---|---|---|---|
| Pixel distance | 1/4-pel | 1/2-pel | 1-pel | 2-pel | 4-pel | 8-pel | 16-pel | 32-pel |

Direction index represents the direction of the MVD relative to the starting point. The direction index can represent of the four directions as shown in Table 4.

TABLE 4

| Direction IDX | 00 | 01 | 10 | 11 |
|---|---|---|---|---|
| x-axis | + | − | N/A | N/A |
| y-axis | N/A | N/A | + | − |

To reduce the encoder complexity, block restriction is applied. If either width or height of a CU is less than 4, UMVE is not performed.

In JVET-L0090 (Hsiao, et al., "*CE4.4.12: Pairwise average candidates*", in Joint Video Exploration Team (JVET) of ITU-T SG 16 WP 3 and ISO/IEC JTC 1/SC 29/WG 11, 12th Meeting: Macao, CN, 3-12 Oct. 2018, Document: JVET-L0090), pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the Merge indices to the Merge candidate list. The averaged motion vectors are calculated separately for each reference list. If both motion vectors are available in one list, these two motion vectors are averaged even when they point to different reference pictures; if only one motion vector is available, use the one directly; and if no motion vector is available, keep this list invalid. The pairwise average candidates replaces the combined candidates in HEVC standard.

In this invention, another Multi-hypothesis mode to improve Inter prediction is disclosed, which improves coding performance for one or more Inter modes such as Skip and/or Merge and/or AMVP mode and/or affine Merge mode and/or affine AMVP mode and/or sub-block Merge mode. The concept for multi-hypothesis mode is to combine an existing hypothesis of prediction with one additional Inter prediction. In the following, MH mode Inter (or also called as MH mode for Merge or MH Merge) is used as an example. In Skip or Merge mode, one Merge index will be used to select one motion candidate from the Merge candidate list. The motion candidate may be either uni-prediction or bi-prediction derived by the candidate itself. The generated motion compensated predictor is called the first hypothesis in this disclosure. For the proposed Multi-hypothesis mode, it will produce the second hypothesis in addition to the first one. The second hypothesis of predictors can be generated by motion compensation from Merge or Skip mode, AMVP mode, affine Merge mode, affine AMVP mode or sub-block Merge mode. When Multi-hypothesis mode is supported, one or more Multi-hypothesis candidates are available for Skip and/or Merge, AMVP mode, affine Merge mode, affine AMVP mode or sub-block Merge mode.

Variances of Multi-hypothesis mode are proposed according to the different settings such as supported mode settings, combined weight settings, applied portion settings, prediction direction settings, different tap settings, forbidden settings, block padding settings, reference picture settings, MV limitation settings, reference MV settings, and any combination of above. The settings mentioned above can be used for the original hypothesis, the additional hypothesis, or multiple hypotheses and can be enabled depending on implicit or explicit signalling. In one embodiment, the implicit assignment can depend on the block width, block height or block size. For example, the settings are applied to the blocks smaller than N×M, where N and M can be selected from {2, 4, 8, 16}. In another example, the settings are applied to certain blocks according to a predetermined table associated with the block width or block height. In another embodiment, the explicit signalling can depend on a flag at a CU level, CTU level, slice level, tile level, picture level, SPS level, PPS level, etc.

Supported mode settings mean multi-hypothesis mode can be used for one or more existing Inter modes, such as Skip, Merge, AMVP, affine Merge, affine AMVP, sub-block Merge mode. The motion information referred to the original hypothesis and the additional hypothesis can be generated from one or more Inter modes mentioned above. In one embodiment, the Inter modes for the original hypothesis and the additional hypothesis need to be the same or can be different. In another embodiment, the Inter modes for the original hypothesis and the additional hypothesis can pre-determined according to a mapping table. For example, if the original hypothesis of prediction is from affine mode and the additional hypothesis of prediction needs to be from Merge mode. In another embodiment, Multi-hypothesis mode can support the improved Inter mode. For example, UMVE candidates can be used to generate the hypothesis of prediction. In another example, the motion information to generate the hypothesis prediction can be acquired through referencing previous coded motion information similar to the history-base scheme. In another example, pairwise average candidates can be used to generate the hypothesis of prediction.

Combined weight settings mean the prediction of multi-hypothesis mode can be generated by summing up multiple hypotheses of prediction with weightings, right-shifting, and then clipping. The weightings can be fixed at one value for each hypothesis or vary with the position of prediction. For example, the weightings for the original and additional hypothesis are 5 and 3, respectively. In another example, the weightings for the original hypothesis is larger than that of the additional hypothesis. In one embodiment, for each hypothesis, each N×M sub-block can share the same weighting, where N and M can be 2, 4, 8, 16, 32, 64, or 128. Alternatively, each pixel of prediction has its own weighting. Any combination of the above can be applied. In another embodiment, the weightings for one hypothesis can be set to be zero and the prediction of another hypothesis can be directly taken as the prediction of this block when the position of prediction is outside a particular margin A, where the "margin" corresponds to a region in the block between the two predictors associated with two hypotheses. The margin width w can be an integer such as 0, 1, 2, 3, 4, 8, or 16. The margin width can vary with the block width or height, along a direction, such as vertical, horizontal or diagonal direction. The weighting of each N×M sub-block can depend on the block width and/or height, partition direction, sub-block position in the CU/PU, sub-block MV, and/or Inter prediction direction.

Applied portion setting means for each block with multi-hypothesis mode enabled, the pixels of prediction can be divided into Region 1, Region 2, and Region 3. One hypothesis can be applied to Region 1; another hypothesis can be applied to Region 2; and the combined prediction can be applied to Region 3. In one embodiment, Region 3 can be the whole block. In other words, the prediction of the whole block is generated from the multiple hypotheses of prediction. In another embodiment, a CU is split into two triangular prediction units, in either of the diagonal directions. Region 1 is one triangular prediction unit; Region 2 is another triangular prediction unit; and Region 3 is the margin, where the margin width can be 0, 1, 2, 3, 4, 8, 16, or 32, along the partition direction. In region 3, the weighting for each sample/pixel or each N×M block can be different. The weighting can depend on the block width and/or height, partition direction, sub-block position in the CU/PU, sub-block MV, and/or inter prediction direction. In another embodiment, Region 3 can be formed by multiple continuous sub-blocks or separate sub-blocks. For example, the sub-region includes the block area excluding the boundary. In another example, the sub-region includes the sub-blocks close to the centre of the block. In still another example, the sub-region includes the sub-blocks at the corners. The portion can be expanded or shrunk depending on a certain criterion such as block width, block height or block size.

Prediction direction settings mean only uni-prediction with one predefined reference list can be used for the hypothesis of Multi-hypothesis mode. The hypothesis with bi-prediction is disallowed or used to generate the hypothesis with uni-prediction through different mechanisms. The mechanism can be to divide one hypothesis with bi-prediction, denoted as {{mvL0, ref0}, {mvL1, ref1}}, into multiple hypotheses with uni-prediction such as Hypothesis 1 with {mvL0, ref0}, Hypothesis 2 with {mvL1, ref1}, etc. The rule to handle the hypothesis with bi-prediction can be predefined, or implicitly derived with block width or block height or block properties (e.g. other applied Inter tools), or explicitly indicated with an signalled flag at a CU level, CTU level, slice level, tile level, picture level, SPS level, or PPS level, etc. For example, when an SPS-level flag is on, the hypothesis with bi-prediction cannot be used for Multi-hypothesis mode; and when the flag is off, the hypothesis with bi-prediction is divided into multiple hypotheses with uni-prediction, which can be used for Multi-hypothesis mode.

When different tap settings are applied to MH mode, the sub-pel interpolation filter with shorter length for motion compensation (MC) can be used to replace the original interpolation filter for MC. The length of the interpolation filter can be 1, 2, 4, 6, or 8. For example, integer-pel MC can be used instead of the sub-pel MC. For another example, 2-tap interpolation filter such as the bilinear interpolation filter can be used for Multi-hypothesis mode. In one embodiment, a shorter interpolation filter can be generated from the interpolation filter, which is already existing and well defined. Therefore, no additional hardware design is needed. For example, a 2-tap interpolation filter can be generated from an 8-tap interpolation filter by summing up the four taps at the left hand side to be one coefficient and the other four taps at the right hand side to be another one coefficient. Therefore, if an 8-tap interpolation filter is defined as {−1, 4, −11, 45, 34, −10, 4, −1}, the corresponding 2-tap interpolation filter is {37, 27}. For another example, a 4-tap interpolation filter for luma can be the same as the existing 4-tap interpolation filter for chroma.

When forbidden settings are applied to MH mode for Merge, the hypothesis will not be added. In other words, the forbidden setting can be viewed as disabling MH mode for Merge in some conditions. The conditions can depend on the block width, block height or block size. For example, when the block is smaller than N×M, MH mode for Merge is disabled, where N can be 4 or 8 and M can be 4 or 8.

While performing fractional MC for a W×H block, where W is the block width and H is the block height, a larger region containing the current block needs to be fetched to apply the interpolation filter. In one embodiment, the region is called a fetched block. For example, for an 8-tap interpolation filter, the size of the fetched block is (W+3+4)×(H+3+4). In one embodiment, when block padding settings are applied to Multi-hypothesis mode, the size of the fetched block can be reduced. The samples, the required for the interpolation filter outside the reduced fetched block can be filled with the samples padded from the boundary of the reduced fetched block. For example, the fetched block can be reduced to the current block and no additional sample outside the current block needs to be fetched. For another example, the fetched block can be reduced to the (W+1)×(H+1) block, containing the current block.

When reference picture settings are applied to Multi-hypothesis mode, only the hypotheses that refer to the same reference picture can be combined. The motion candidate with a different reference picture is disallowed or the motion candidate has to generate a new valid motion candidate through MV scaling. The mechanism of MV scaling is described as follows. When the first motion candidate for one hypothesis is uni-prediction, the MVs of the second motion candidate for the additional hypothesis needs to be scaled to the reference picture of the first motion candidate. When the first motion candidate is bi-prediction with motion vectors MV0 and MV1, the MV0/MV1 of the second motion candidate can be scaled to reference picture 0/1, respectively. Alternatively, the MV0/MV1 of the second motion candidate can be scaled to one of reference picture 0 and reference picture 1, which is nearest to MV0/MV1 of the second motion candidate respectively. MV0 refers to reference picture 0 and MV1 refers to the reference picture 1.

When MV limitation settings are applied to Multi-hypothesis mode, only the hypotheses that satisfies the predefined motion conditions can be used for Multi-hypothesis mode. The motion condition can be the reference index being the same as that for the other hypothesis, the motion vectors being within a predefined region, or any combination of above. The allowable distance between the MVs within the same reference picture for multiple hypotheses can depend on the block width or block height or the overlapping region referred by the MVs within the same reference picture from multiple hypotheses. For those MVs within the same reference picture, but exceeding the allowable distance, one possible way is to disallow the MH mode and another possible way is to shrink the MV values or adjust the MV directions into the allowable distance.

When reference MV settings are applied to Multi-hypothesis mode, the motion information of Multi-hypothesis can be referenced with some constraints. In one embodiment, when the information of the second hypothesis is referenced by the following PUs, same reference frame constraints should be applied. For example, if the collocated PUs from reference frames are coded using Multi-hypothesis mode, only one set of motion data from either the first or the second hypothesis can be referenced. This will prevent the original buffer size from double storing motions for temporal reference. In still another embodiment, same CTU constraints should be applied. For example, if the neighbouring PUs in the same frame are coded using Multi-hypothesis mode, the Intra mode or motion information from second hypothesis can be referenced only when the PUs belong to the same CTU as the current PU. This will prevent the CTU line buffer from storing the Intra mode or motion data.

Any combination of the above settings can be applied. For example, the combined-weight settings, applied-portion settings and prediction direction settings can be combined. In another example, a CU is split into two triangular prediction units in either of two diagonal directions. Each triangular prediction unit in the CU is Inter-predicted using its own uni-prediction motion vector and reference frame index. An adaptive weighting process, where the weight for each N×M sub-block is the same, is performed to the diagonal edge after predicting the triangular prediction units. Then, the transform and quantization processes are applied to the whole CU. In another example, different tap settings and block portion settings are combined. In other words, sub-pel interpolation filters with different lengths can be applied to different portions of the block. For example, for the sub-region on the boundary of the block, integer-pel MC is used; for the sub-region nearing the centre of block, longer length of sub-pel interpolation filter is used; and for the rest sub-regions, shorter length of sub-pel interpolation filter is used.

Any of the foregoing disclosed methods can be implemented in encoders and/or decoders. For example, any of the proposed methods can be implemented in an Inter coding module of an encoder, a motion compensation module, a Merge/Inter candidate derivation module of a decoder. Alternatively, any of the disclosed methods can be implemented as a circuit coupled to the Inter coding module of an encoder and/or motion compensation module, a Merge/Inter candidate derivation module of the decoder.

Figure 9:
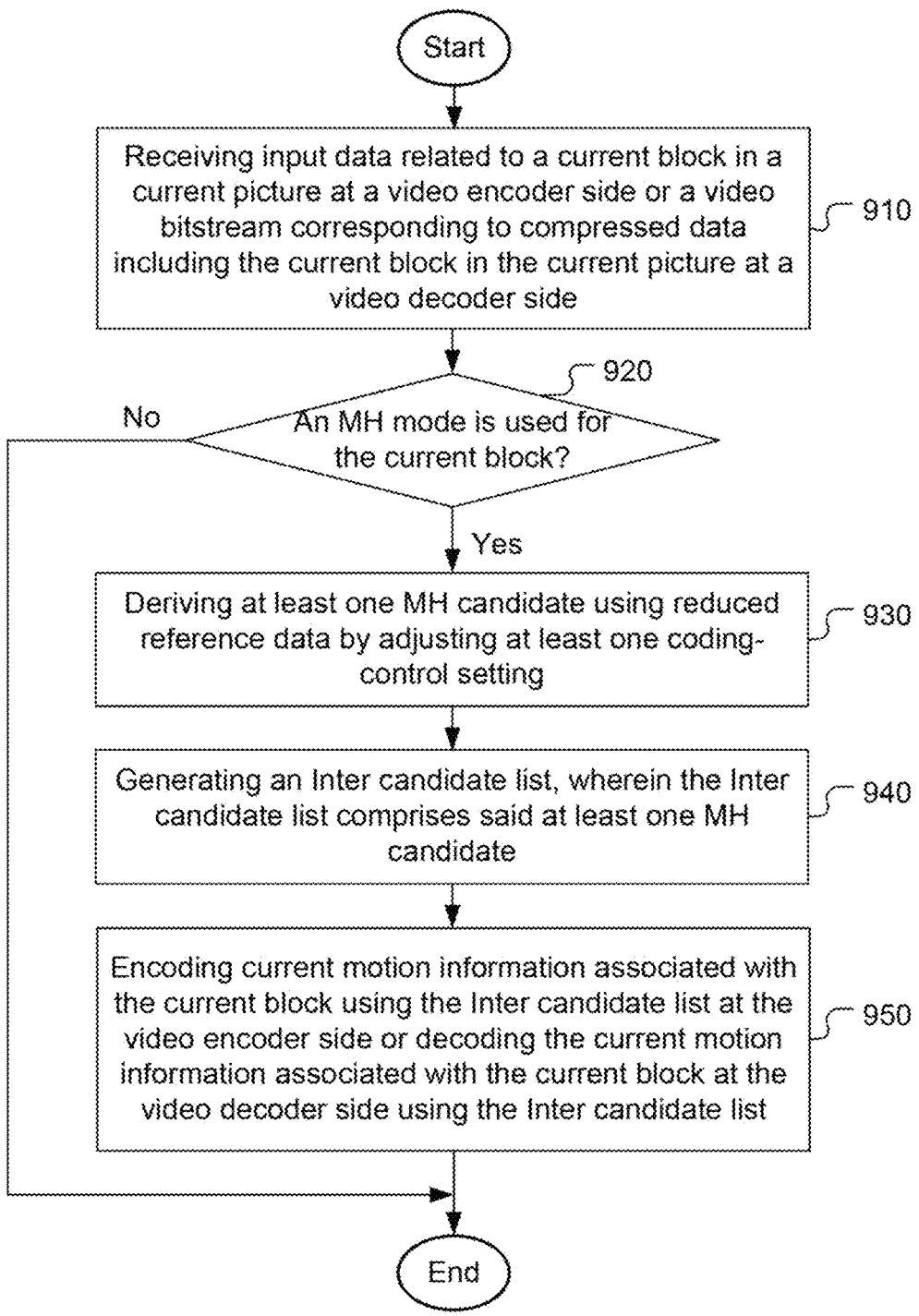
FIG. 9 illustrates a flowchart of an exemplary Inter prediction for video coding, where the Inter prediction allows Multi-hypothesis (MH) by combining a first predictor based on a first hypothesis and at least one second predictor based on at least one second hypothesis according to an embodiment of the present invention.

FIG. 9 illustrates a flowchart of an exemplary Inter prediction for video coding, where the Inter prediction allows Multi-hypothesis (MH) by combining a first predictor based on a first hypothesis and at least one second predictor based on at least one second hypothesis according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture is received at a video encoder side or a video bitstream corresponding to compressed data including the current block in the current picture is received at a video decoder side in step 910. Whether an MH mode is used for the current block is checked in step 920. If the MH mode is used for the current block (i.e., the "yes" path from step 920), steps 930 to 950 are performed. Otherwise (i.e., the "no" path from step 920), steps 930 to 950 are skipped. In step 930, at least one MH candidate using reduced reference data is derived by adjusting at least one coding-control setting. In step 940, an Inter candidate list is generated, where the Inter candidate list comprises said at least one MH candidate. In step 950, current motion information associated with the current block is encoded using the Inter candidate list at the video encoder side or the current motion information associated with the current block is decoded at the video decoder side using the Inter candidate list The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Inter prediction for video coding, wherein the Inter prediction allows Multi-hypothesis (MH) by combining a first predictor based on a first hypothesis and at least one second predictor based on at least one second hypothesis, the method comprising:
   receiving input data related to a current block in a current picture at a video encoder side or a video bitstream corresponding to compressed data including the current block in the current picture at a video decoder side;
   if an MH mode is used for the current block:
      deriving at least one MH candidate using reduced reference data by adjusting at least one coding-control setting;
      generating an Inter candidate list, wherein the Inter candidate list comprises said at least one MH candidate; and
      encoding current motion information associated with the current block using the Inter candidate list at the video encoder side or decoding the current motion information associated with the current block at the video decoder side using the Inter candidate list.

2. The method of claim 1, wherein said at least one coding-control setting corresponds to prediction direction setting.

3. The method of claim 2, wherein if a target Inter candidate used for deriving said at least one MH candidate is bi-prediction, the target Inter candidate is used as uni-prediction for deriving said at least one MH candidate.

4. The method of claim 3, wherein the target Inter candidate is divided into two uni-prediction candidates for deriving said at least one MH candidate.

5. The method of claim 1, wherein one or more rules regarding handling a target Inter candidate used for deriving said at least one MH candidate are pre-defined, implicitly determined or explicitly indicated.

6. The method of claim 5, wherein said one or more rules are explicitly indicated by a flag at a CU (coding unit) level, CTU (coding tree unit) level, slice level, picture level, SPS (sequence parameter set), picture level, or PPS (picture parameter set), wherein the flag is signalled at the video encoder side or parsed at the video decoder side.

7. The method of claim 1, wherein said at least one coding-control setting corresponds to filter tap setting for an interpolation filter used for deriving a reference pixel at a sub-pel location for deriving said at least one MH candidate.

8. The method of claim 7, wherein a shorter interpolation filter is used.

9. The method of claim 8, wherein the shorter interpolation filter corresponds to a 2-tap interpolation filter.

10. The method of claim 8, wherein the shorter interpolation filter is generated from a regular interpolation filter corresponding to a longer interpolation filter.

11. The method of claim 1, wherein said at least one coding-control setting corresponds to block size associated with a reference block to be fetched for deriving motion compensated samples of the current block at locations including sub-pel locations, wherein the reference block includes additional rows, additional columns or both for deriving the motion compensated samples at the sub-pel locations, and wherein the additional rows, the additional columns or both are reduced.

12. The method of claim 11, wherein the additional rows, the additional columns or both being reduced are padded from one or more boundaries of reduced fetched reference block.

13. The method of claim 11, wherein the additional rows and the additional columns are reduced to zero or reduced to 1 row and 1 column.

14. The method of claim 1, wherein said at least one coding-control setting corresponds to reference picture setting.

15. The method of claim 14, wherein if a target Inter candidate refers to a same reference picture as the current block, the target Inter candidate is used for deriving said at least one MH candidate.

16. The method of claim 14, wherein if a target Inter candidate for deriving said at least one MHI candidate refers to a different reference picture from the current block, motion vector scaling is applied to a target motion vector of the target Inter candidate to generate a scaled motion vector referring to a same reference picture as the current block.

17. The method of claim 1, wherein said at least one coding-control setting corresponds to motion limitation setting.

18. The method of claim 17, wherein if the first predictor and said at least one second predictor have a same reference picture index, the first predictor and said at least one second predictor are combined to derive said at least one MHI candidate.

19. The method of claim 17, wherein if the first predictor and said at least one second predictor have a same reference picture index and a first motion vector of the first predictor and a second motion vector of the second predictor are within a predefined region, the first predictor and said at least one second predictor are combined to derive said at least one MHI candidate.

20. The method of claim 1, wherein the Inter candidate list is derived for Skip, Merge, AMVP, affine Merge mode, affine AMVP mode, or sub-block Merge mode.

21. An apparatus of video coding, the apparatus comprising one or more electronic circuits or processors arranged to:
receive input data related to a current block in a current picture at a video encoder side or a video bitstream corresponding to compressed data including the current block in the current picture at a video decoder side;
if an MHI mode is used for the current block:
derive at least one MHI candidate using reduced reference data by adjust at least one coding-control setting;
generate an Inter candidate list, wherein the Inter candidate list comprises said at least one MHI candidate; and
encode current motion information associated with the current block using the Inter candidate list at the video encoder side or decode the current motion information associated with the current block at the video decoder side using the Inter candidate list.

* * * * *